(12) United States Patent
Li et al.

(10) Patent No.: US 11,087,126 B2
(45) Date of Patent: Aug. 10, 2021

(54) METHOD TO IMPROVE PERFORMANCE IN DOCUMENT PROCESSING

(71) Applicant: Xerox Corporation, Norwalk, CT (US)

(72) Inventors: Xing Li, Webster, NY (US); Dhevendra Alagan Palanivel, Chennai (IN); Sainarayanan Gopalakrishnan, Chennai (IN); Rajasekar Kanagasabai, Medavakkam (IN)

(73) Assignee: XEROX CORPORATION, Norwalk, CT (US)

( * ) Notice: Subject to any disclaimer, the term of this patent is extended or adjusted under 35 U.S.C. 154(b) by 263 days.

(21) Appl. No.: 16/441,601

(22) Filed: Jun. 14, 2019

(65) Prior Publication Data

US 2020/0394397 A1 Dec. 17, 2020

(51) Int. Cl.
*G06K 9/00* (2006.01)
*H04N 1/407* (2006.01)
*G06T 7/13* (2017.01)

(52) U.S. Cl.
CPC ..... *G06K 9/00463* (2013.01); *G06K 9/00469* (2013.01); *G06T 7/13* (2017.01); *H04N 1/4072* (2013.01); *G06T 2207/30176* (2013.01)

(58) Field of Classification Search
CPC ........... G06K 9/00463; G06K 9/00469; G06K 9/46; H04N 1/4072; G06T 7/13; G06T 2207/30176

USPC .......................................................... 382/176
See application file for complete search history.

(56) References Cited

U.S. PATENT DOCUMENTS

| 7,058,222 | B2 | 6/2006 | Li et al. |
| 8,165,388 | B2 | 4/2012 | Li |
| 9,355,313 | B2* | 5/2016 | Sesum ............... G06K 9/00463 |
| 2006/0008113 | A1* | 1/2006 | Matsukubo ........ G06K 9/00456 382/100 |
| 2008/0311551 | A1* | 12/2008 | Reed .................... G06K 9/2063 434/356 |

* cited by examiner

*Primary Examiner* — Daniel G Mariam
(74) *Attorney, Agent, or Firm* — Fay Sharp LLP

(57) ABSTRACT

A document processing system produces a digital representation of an original image by determining a background level for white space of the original image. Using the background level, the system identifies pixels not belonging to the white space. The system generates a binary image of the original image based from the identified pixels. The system then identifies image content surrounded by the white space in the original image using the binary image. Next, the system generates a block for each image content and extracts each block from the original image. After processing each block, the system reapplies the processed blocks to a blank canvas to generate the digital representation.

20 Claims, 7 Drawing Sheets

METHOD TO IMPROVE PERFORMANCE IN DOCUMENT PROCESSING

BACKGROUND

The present exemplary embodiment relates to a method and system for processing a document having content in the form of text and/or images on a page. It will be described with particular reference to copy, scan and print jobs. However, it is to be appreciated that the present exemplary embodiment is also amenable to other like applications.

In image processing, the desire for high performance drives the development of systems that can perform operations over large amounts of data. Some systems rely on a software-based image path for processing image data. Generally, software-based image paths divide an input image into multiple tiles to utilize the GPUs/multiple cores that are available. A key challenge with implementing a software-based image path is performance optimization. The complexity of these systems, and the size of images, demand substantial computational effort.

Despite the computational load, software-based image paths provide advantages in cost and flexibility over hardware-based image paths. Although these advantages have promoted a wider adoption of software-based image paths in consumer and commercial products, their development is often constrained by the familiar approach to hardware-based image paths, where the steps are performed by specifically designed hardware circuitry. Because hardware-based image paths have been used for many years, recently developed software-based paths tend to follow the models employed in the hardware alternative.

In both the current hardware and software-based practices, the processing is performed on every pixel in a document, page, or image. Most pages in a print job have areas that require no marking of material. These areas are referred to as "white space", which is a region with no text or image. For copies, scans, and print jobs, the pixels in the white space regions require and undergo the same amount of processing as the pixels in the image and text regions (hereinafter collectively referred to as "image content"). Such processing unnecessarily prolongs the execution time for generating the final print job.

Furthermore, a parallel software-based image processing operation can also be employed in systems to reduce the print time. In such systems, a page can be divided into different parts from which the image data is processed simultaneously. Because a pixel-by-pixel computation is performed on every part, the computational load is not reduced.

One challenge to such parallel systems occurs in connection with the processing step known as error diffusion, which is normally processed in a linear sequence. Stitching—that is, reassembling—the different parts of a page back together is problematic to the extent that artifacts may be visible at the boundaries of the parts.

Therefore, an improved method and system are desired for processing image data that reduces the time for executing a print job while also improving the quality of the final output.

INCORPORATION BY REFERENCE

The contents of U.S. Pat. No. 7,058,222 to Li et al., issued Jun. 6, 2006, and titled "Automatic Background Detection of Scanned Documents" are incorporated herein in its entirety.

The contents of U.S. Pat. No. 8,165,388 to Li, issued Apr. 14, 2012, and titled "Neutral Pixel Detection in an Image Path are incorporated herein in their entirety.

BRIEF DESCRIPTION

Disclosed in various embodiments herein is a method for processing image data for a document processing system. First, an input document is acquired at the document processing system. The method includes the step of determining a background level for white space of the input document. Using the background level, the method includes identifying pixels not belonging to the white space. The method further includes generating a binary image of the input document based from the identified pixels. Next, the method performs the step of identifying image content surrounded by the white space in the input document using the binary image. In the method, a block is generated for each image content and each block is extracted from the input document. In this manner, processing can be performed on each block. Finally, the method reapplies the processed blocks to a blank canvas to generate an output document.

Further disclosed in various embodiments is a document processing system. The document processing system includes a document processing device, which produces a digital representation of an original image. A processor, belonging to the system, executes instructions for producing the digital representation. The system determines a background level for white space of the original image. Using the background level, the system identifies pixels not belonging to the white space. The system generates a binary image of the original image based from the identified pixels. The system then identifies image content surrounded by the white space in the original image using the binary image. Next, the system generates a block for each image content and extracts each block from the original image. After processing each block, the system reapplies the processed blocks to a blank canvas to generate the digital representation.

DETAILED DESCRIPTION

Figure 1:
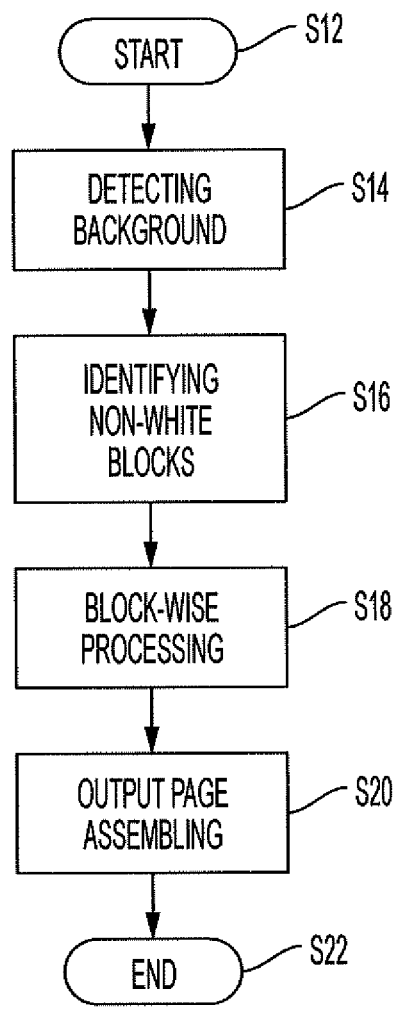
FIG. 1 is a flow chart showing an overview of the disclosed method for processing a document.

The present disclosure is directed to a method of processing image data for a document processing system. The method reduces print time by eliminating the processing operations performed on pixels that belong to white space. FIG. 1 is an overview of a method 10 for processing a document. The method starts at S12. In a first step, in response to acquiring an input document at a document processing system, a background level for white space in the document is determined at S14. Using the background level, the pixels not belonging to the white space are identified and the remaining pixels are associated with image content. Next, at S16 a block is generated for each region of image content that is surrounded by white space in the input document. Each block is extracted from the document, and downstream processing is performed on each block at S18. The processed blocks are reapplied to the blank canvas to generate an output document page at S20. The method ends at S22.

Figure 2:
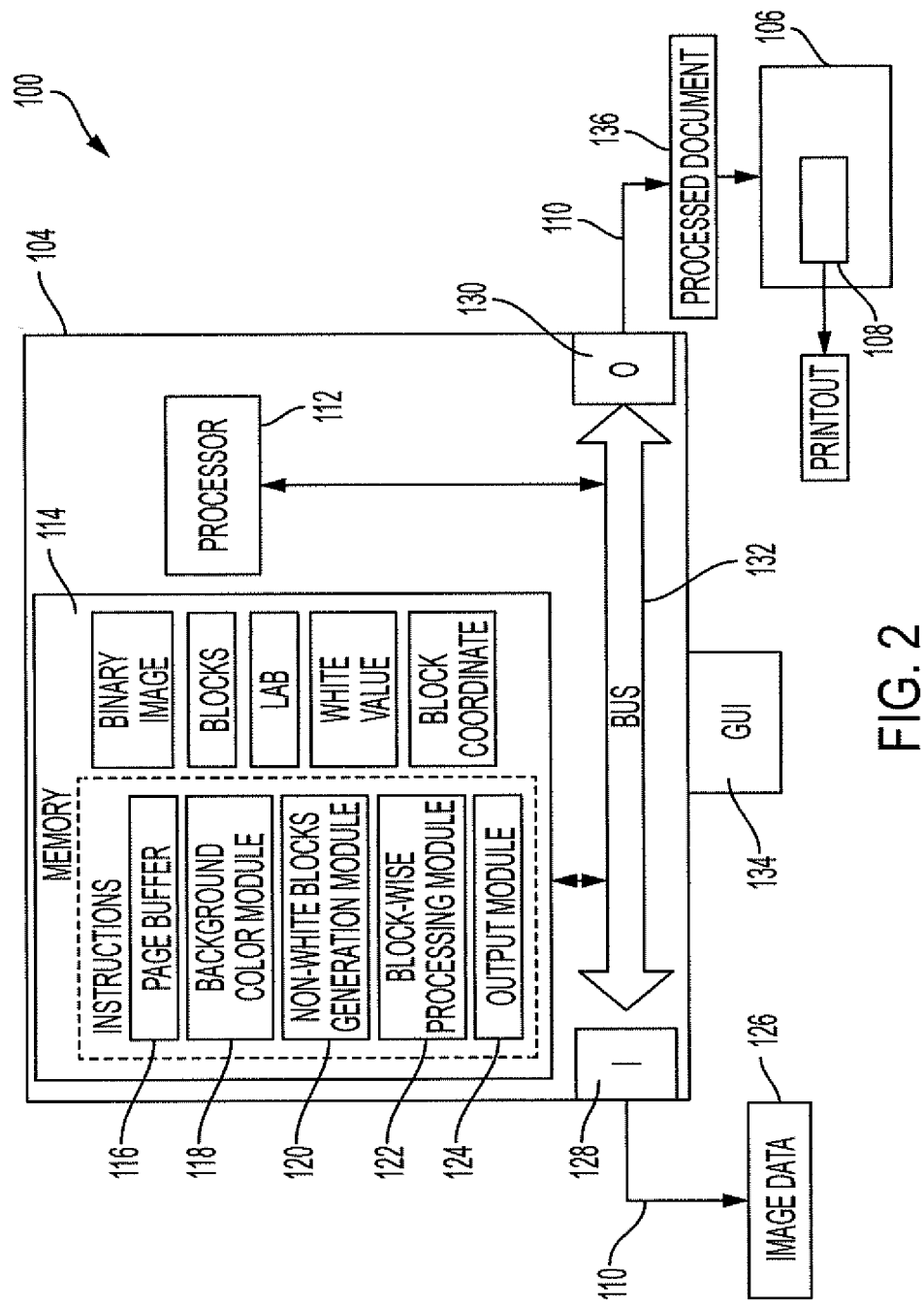
FIG. 2 is a schematic illustration of a system for generating a document according to one aspect of the exemplary embodiment.

FIG. 2 is a schematic illustration of a system 100 for generating a document, according to one aspect of the exemplary embodiment. The system 100 may include a document processing system, hosted by a computing device 104 such as a digital front end ("DFE") or controller, and an image forming apparatus or printer device 106, including a marking engine or similar rendering device 108, which are linked together by communication links 110, referred to herein as a network. These components are described in greater detail below.

The computing device 104 illustrated in FIG. 2 includes a processor 112, which controls the overall operation by execution of processing instructions, which are stored in memory 114 connected to the processor 112.

The image processing operation disclosed herein is performed by the processor 112 according to the instructions stored in the memory 114. In particular, the memory 114 stores a page buffer 116; a background detection module 118; a non-white blocks generation module 120 or X-Y cut segmentation module; a block-wise processing module 122; and an output module 124. These modules 116-124 will be later described with reference to the exemplary method. In general, the modules 116-124 take an instruction and image data 126 of an original document, received as input for rendering the document, and provide processes the document for improved handling at the printer device 106, particularly for improving both quality and print speed when rendering the output 136.

The computing device 104 includes one or more communication interfaces (I/O), such as network interfaces 128, 130 for communicating with external devices, such as printer device 106. The various hardware components 112, 114 (including random access memory "RAM") of the computing device 104 may all be connected by a bus 132.

With continued reference to FIG. 2, the computing device 104 is communicatively linked to a user interface device (GUI) 134 via a wired and/or wireless link. In various embodiments, the user interface device 134 may include one or more of a display device, for displaying information to users, and a user input device, such as a keyboard or touch or writable screen, for inputting instructions and/or receiving a visual display of the output, and/or a cursor control device, such as a mouse, trackball, or the like, for communicating user input information and command selections to the processor 112. Specifically, the user interface device 134 includes at least one of an input device and an output device, both of which include hardware, and which are communicatively linked with the computing device 104 via wired and/or wireless link(s).

As mentioned, the computing device 104 of the system 100 is communicatively linked with the printer 106 via link 110. While the computing device 104 may be linked to as few as one printer 106, in general, it can be linked to a fleet of printers. The exemplary printers 106 may each include the marking engine 108, which applies marking medium, such as ink or toner, to a substrate, such as paper, using, for example, a laser, inkjet, thermal, or other transfer process. The printer 106 renders images on print media, such as paper, and can be a copier, laser printer, bookmaking machine, facsimile machine, or a multifunction machine (which includes one or more functions such as scanning, printing, archiving, emailing, and faxing).

The memory 114 may represent any type of tangible computer readable medium such as random-access memory (RAM), read only memory (ROM), magnetic disk or tape, optical disk, flash memory, or holographic memory. In one embodiment, the memory 114 may each comprise a combination of random-access memory and read only memory. The digital processor 112 can be variously embodied, such as by a single-core processor, a dual-core processor (or more generally by a multiple-core processor), a digital processor and cooperating math coprocessor, a digital controller, or the like. The digital processors 112 in addition to controlling the operation of the computing device 104, executes instructions stored in the modules 116-124 for performing the parts of the method outlined below.

The software modules 116-124 as used herein, are intended to encompass any collection or set of instructions executable by the system 100 to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 128, 130 may include, for example, a modem, a router, a cable, and and/or Ethernet port, etc.

As will be appreciated, while computing device 104 and printer 106 are illustrated by way of example, the system 100 may be hosted by fewer or more linked computing devices. Each computing device may include, for example, a server computer, desktop, laptop, or tablet computer, smartphone or any other computing device capable of implementing the method described herein. Alternatively, the computing device 104 can be incorporated in the printer device 106.

Figure 3:
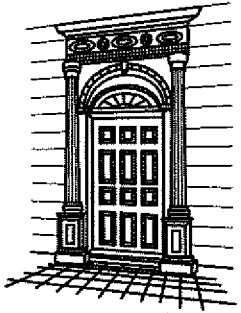
FIG. 3 is an original document page shown as a sample input for processing by the system of FIG. 2.

FIG. 3 shows an example of an original image (synonymously referred to as "page") to be processed by the system of FIG. 2. The page 30 can also define a single page print job. Alternatively, the page can be part of a multi-page document, whereby each page in the document can be processed in likewise manner. In the illustrative embodiment, the original document has a white background or canvas. Because many documents have white backgrounds, the present disclosure will be described with reference to white backgrounds; however, there is no limitation to the canvas/page/background color employed with the present method and by the present system.

Figure 4:
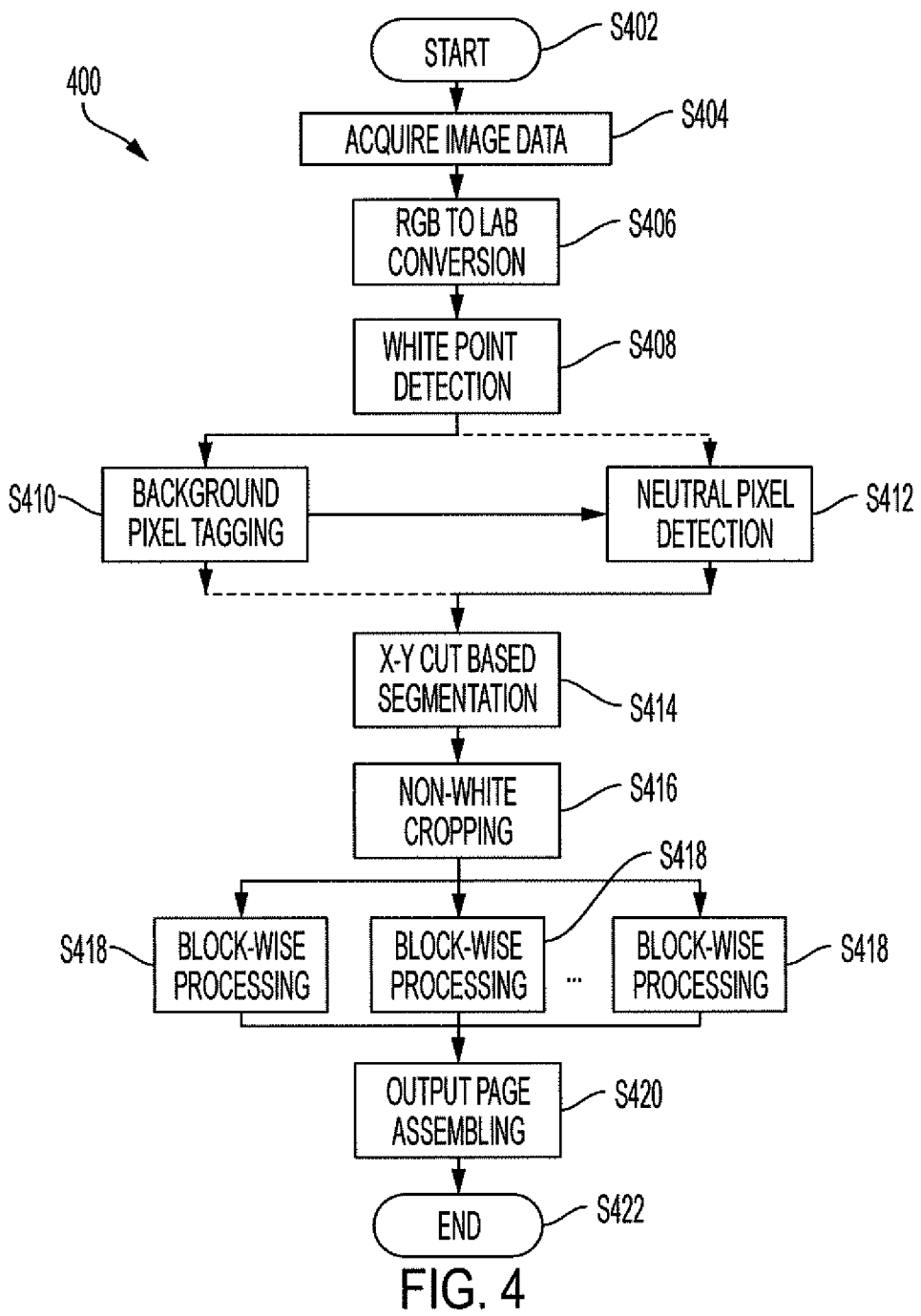
FIG. 4 is a flow chart showing a method for processing a document page according to one aspect of the exemplary embodiment.

A more detailed method 400 for processing a document page according to the exemplary embodiment is shown in FIG. 4. The method starts at S402. The document processing system acquires an original input document at S404. This document can be acquired by known methods, such as by scanning or electronic delivery. The page buffer 116 receives the image data. In one embodiment, the page buffer 116 converts the RGB color space of the original document to L*a*b* color space at S406. The background detection module 118 employs the L*a*b* values associated with each pixel in the page to determine a background level for the white space of the original document. The background detection module 118 determines the background level—also referred to as "white" herein—for the original input document at S408. This background level refers to the color of the canvas or white space (32 in FIG. 3) in the original document.

In one embodiment, the system 100 can determine the L*a*b* value for "white" of the document by preforming a histogram for the whole page. U.S. Pat. No. 7,058,222, titled "Automatic Background Detection of Scanned Documents" to Applicant, the contents of which are incorporated herein in their entirety, discloses one example of a background detection process. In summary, a background value can be detected by generating a histogram from pixels within a document region representing a page. A white peak is identified using the histogram. A peak (often referred to as white-point, white-peak, or background peak) is the gray level with the greatest number of pixels having an intensity related to the background (e.g., white) value of the document or image being scanned.

Now that the white "value" of the document page is determined, the system determines the pixels belonging to image content from those belonging to white space. Continuing with FIG. 4, the system 100 performs a background detection on each pixel at S410. For a given pixel, the system 100 can determine an intensity of the pixel. The intensity of the pixel is compared to the intensity of the background level or, more preferably, to a predetermined range corresponding to the intensity of the background level. The pixel is classified as belonging to white space if the intensity falls within a predetermined range. The pixel is classified as belonging to image content if the intensity falls outside the predetermined range. In one embodiment, the system can generate a tag for a given pixel in response to the background detection. In another embodiment, the pixel can be treated as a candidate white space or a candidate image content, which can be verified by further processing.

In an alternative embodiment, a neutral pixel detection is employed to determine a chrominance value of a given pixel. The background color module 118 or another existing module in the system 100 can generate a neutral pixel detection tag for each pixel at S412. U.S. Pat. No. 8,165,388, titled "Neutral Pixel Detection in an Image Path, to Applicant, the contents of which are incorporated herein in their entirety, discloses one example method for pixel level neutral detection. In summary, the chrominance of a given pixel is determined using the luminance variation between the pixel and neighboring pixels. The neutral pixel detection tag is determined by comparing the chrominance value to a predetermined chrominance threshold, which can be based on a chrominance of the white value.

In a preferred embodiment, the system can perform the neutral pixel detection on the pixel at S412 in response to the background level of the pixel meeting a predetermined threshold. In response to the chrominance value meeting the predetermined chrominance threshold, the system generates the tag for the pixel.

One aspect of performing the background detection at S410 and the neutral detection at S412 is that it eliminates or reduces the risk of misclassification of nonwhite pixels as belonging to the background white canvas. In some instances, a yellow pixel can fall in the white peak(s) in the background detection and be mistaken as a white based on its light intensity or luminance. Therefore, the neutral detection is employed to verify classifications for each pixel and to filter misclassifications. Particularly, a tag for a pixel is generated based on two conditions including (1) where the pixel's intensity falls on the peak generated in the background detection and (2) whether the pixel's chrominance value meets the predetermined threshold. The background and neutral pixel detections are used to classify the pixels as white or non-white.

Generally, the background levels are used to identify pixels not belonging to the white space and, thus, determine the image blocks in the document page. Continuing with FIG. 4, the tags are fed into an X-Y cut algorithm at S414 to determine elements of the input document. Specifically, an X-Y cut-based segmentation is performed on the pixels by the non-white blocks generation module 120 to decompose the image into a set of blocks. Recursive X-Y cut is a projection profile-based method for page segmentation. More specifically, the X-Y cut is a top-down page segmentation technique that decomposes the page into sets of connected components, where each set corresponds to image content. To determine the connected components, the image contents are projected onto an x-axis (i.e., a horizontal projection) and y-axis (i.e., a vertical projection) to determine if a candidate pixel is surrounded by white. In more specific detail, horizontal and vertical projections are initially computed by summing up all the pixels in a line. Then, the image is segmented recursively into blocks by making cuts at the most prominent valley of the projections in the horizontal and vertical directions at each step. The cut is made when the size of the valley is greater than a threshold.

More particularly, the results of the background detection at S410 and neutral pixel detection at S412 are employed to determine which pixels belong to the background canvas of the page, and which—in other words—are affiliated with the "white" value of the canvas. The tag is a binary tag associating the pixel as belonging to one of white pixel and or non-white pixel (collectively all other pixels including those that are not white or different shades of white). As part of the segmentation operation, the tags are used to generate a binary image of the original document page. The binary image is then used to identify the image content in the original image that is surrounded by white space. The system 100 creates a block for each region of image content in the binary image by creating a bounding box around each set of connected components.

Normally, the input to the X-Y cut algorithm is a binarized version of the original page obtained through a thresholding operation. One aspect of the present system, however, is that it eliminates the thresholding operation in the conventional X-Y cut segmentation. Instead, the present disclosure employs a tag that it assigns a "0" or "1" value, distinguishing pixels from the "white" value associated with the canvas and all other pixels, including those that are white or yellow, but appearing white. Therefore, by employing the tags, the disclosed approach does not cause accidental loss of image content in the final output.

Figure 5:
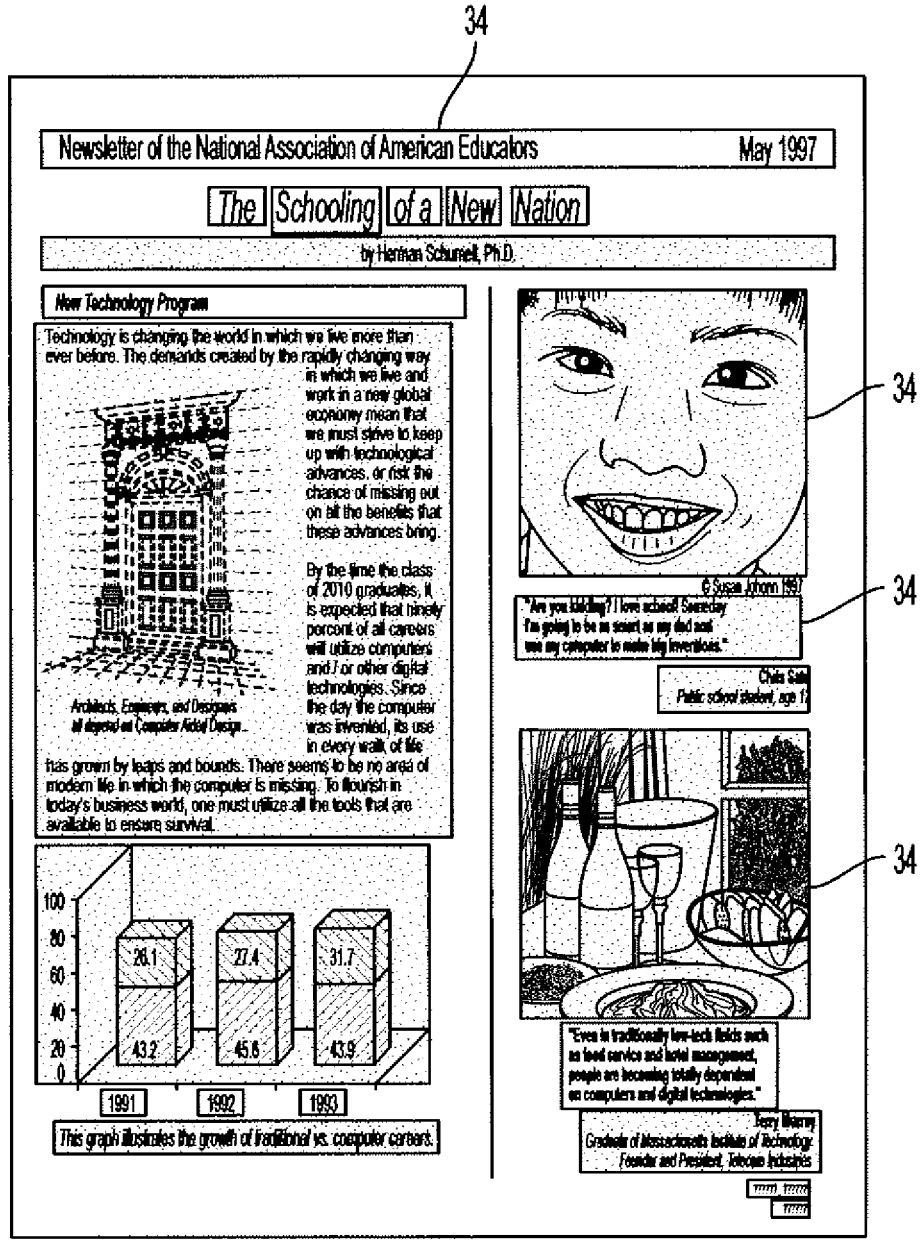
FIG. 5 shows the page of FIG. 3 as segmented blocks during a processing step in the method of FIG. 4.

Turning to FIG. 5, the sample document is shown after the X-Y cut algorithm is performed on the input page of FIG. 2. FIG. 5 illustrates numerous segmented blocks of image content each shown using a virtual bounding box 34. FIG. 5 illustrates that a block (or bounding box) is generated for each image content that is surrounded by white space. As FIG. 5 illustrates, the blocks are not limited to any size. The blocks 34 are shown in various sizes as capturing the various sizes of image content.

Furthermore, during the X-Y cut segmentation at S414, the coordinates of each bounding box that contain image content are determined. The system stores the coordinate information for later retrieval.

Returning to FIG. 4, the system employs the bounding box information to crop the bounded image content from the page at S416 for downstream processing. The cropping is performed by extracting the individual blocks, as separate blocks, from the page based on the blocks' respective coordinates. By extracting the bounded image content from the page, a blank canvas is generated. The blocks, however, are processed in parallel at S418, the as a cluster. The major functions of the block-wise processing operation are shown in FIG. 6.

Figure 6:
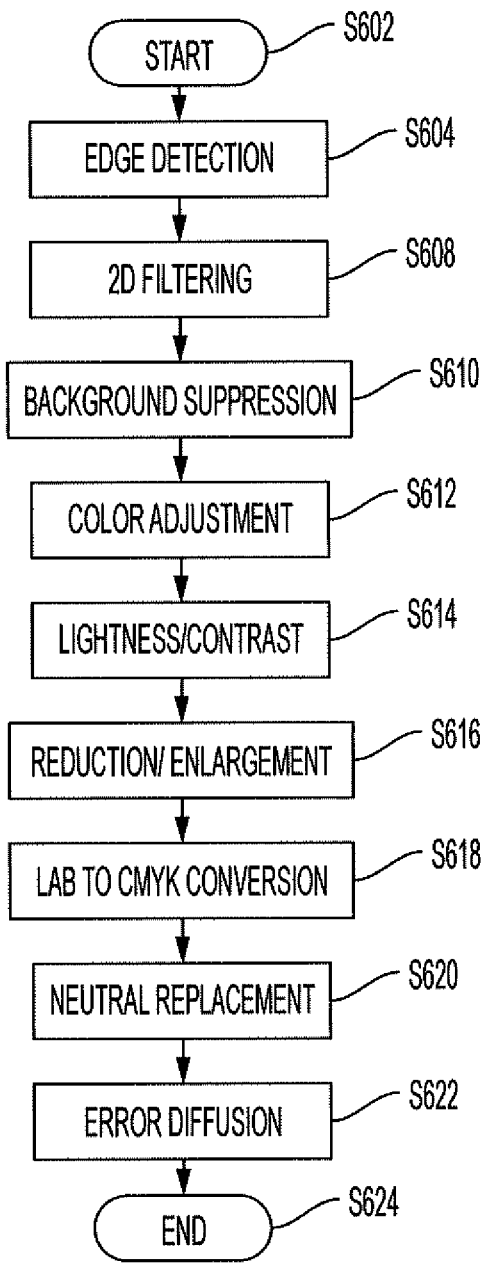
FIG. 6 is a flow chart showing a series of operations performed on the document page.

Turning to FIG. 6, a series of operations performed on a block of image content is shown. These operations can be performed by the block-wise processing module 122 or by a series of similar functioning modules. There is no limitation made herein to the exact operations or to the sequence; each operation may be optionally performed on a block and may be performed in the illustrative sequence or in a different sequence. The method starts at S602. The processing on each block can include one or more of the operations of edge detection S604; two-dimensional filtering S606 for sharpness, enhancement and/or noise reduction; background suppression S608; color adjustment S610; lightness adjustment and/or contrast adjustment (collectively S612); resizing S614; color space (e.g., L*a*b* to CMYK) conversion S616; neutral replacement S618; error diffusion S620; dynamic range adjustment (not shown); rendering to binary (not shown); and a combination of the above according to known methods.

One aspect of the present disclosure is that it allows for the operation of error diffusion to be performed on multiple blocks in parallel because the image contents were surrounded by white space. In a conventional error diffusion, pixels are processed in linear fashion, where the difference between a current pixel's grayscale value and a threshold value is considered as error. To achieve the effect of continuous-tone illusion, the error is distributed to neighboring pixels that have not yet been processed. This sequence therefore complicates parallel error diffusion efforts, which can create a performance bottleneck. In conventional approaches, the step of combining multiple blocks of image content has caused artifacts to appear at the boundaries of the blocks in the final output, particularly if the image content overlaps at the boundaries. These artifacts can appear as discontinuities, deformations or misalignments. Error diffusion is further problematic to the extent that it enhances the edges of an image.

However, the present disclosure allows for the processing method of FIG. 6 to be performed simultaneously on multiple blocks, including the error diffusion. There are known image data processing approaches that process other operations in FIG. 6 in parallel. However, these approaches divide the page into multiple tiles and perform processing on each tile—requiring that all the pixels in the page are processed including the pixels belonging to the white space. In the present approach, the processing is performed in parallel on each extracted block of image content surrounded by white space. Therefore, the processing is limited to only the blocks of image content while no processing is performed on the pixels belonging to the white space. The blocks are processed in parallel as appropriate while the white space is spared of heavy-duty processing, and thus the system reduces its computational load. The method of FIG. 6 ends at S622.

Figure 7:
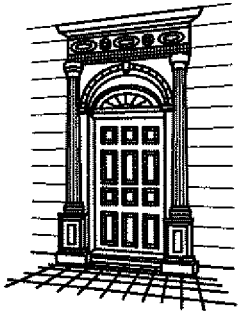
FIG. 7 shows a final page as a sample output of the page in FIG. 3, after undergoing the document processing disclosed in the exemplary embodiment.

Returning to FIG. 4, in this manner, the disclosed method foregoes the processing on pixels belonging to the white space. Once the bounding boxes are processed, the system 100 reassembles the processed blocks back on the page. Therefore, an output page is assembled at S420 using the processed blocks. In one embodiment, the processed blocks are reapplied or pasted onto the blank canvas using the stored coordinates associated with each extracted block. The blocks are reapplied to the blank canvas to generate an output document. FIG. 7 shows a final page 56 as a sample output of the page in FIG. 3, after undergoing the document processing disclosed in the exemplary embodiment. FIG. 7 illustrates that, when reapplied to the canvas, the blocks are separated by white space 58. In other words, as the image content is reassembled, there is no visible stitching error. The white space, between the image contents, eliminates or reduces the risk of stitching artifacts associated with boundaries in conventional processes. The method ends at S422.

After the final output image is generated, the output module 124 can transmit the image to the printer 106 for rendering by the marking engine 108.

One aspect of the disclosure is to provide a simple detection of white space contained in many documents. The present disclosure reduces the processing and/or print time by foregoing the processing on pixels associated with the detected white space. The present disclosure reduces the require computation for executing a print job. The print time is reduced by as much as fifty percent (50%).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of processing image data for a document processing system, the method comprising:
    acquiring an input document at the document processing system;
    determining a background level for white space of the input document;
    using the background level, identifying pixels not belonging to the white space;
    generating a binary image of the input document based from the identified pixels;
    identifying image content surrounded by the white space in the input document using the binary image;
    generating a block for each image content;
    extracting the each block from the input document;
    performing processing on the each block; and
    reapplying the processed blocks to a blank canvas to generate an output document.

2. The method of claim 1 further comprising:
    generating the block for the each image content by creating a bounding box around the each image content;
    determining coordinates of the each bounding box;
    reapplying the processed blocks to the blank canvas using the coordinates.

3. The method of claim 1 further comprising:
performing the processing on the each block in parallel while foregoing the processing on pixels belonging to the white space.

4. The method of claim 1, wherein the block generated for the each image content is surrounded by white space; wherein the processed blocks reapplied to the blank canvas are separated by white space; wherein the white space between the blocks on the canvas avoid stitching artifacts.

5. The method of claim 1, wherein the generating the binary image of the input document includes:
performing background detection on a given pixel to determine whether the given pixel belongs to the white space or to image content;
performing a neutral pixel detection on the given pixel to generate a tag for the each pixel; and,
feeding the tags into an X-Y cut algorithm to determine elements of the input document.

6. The method of claim 5, wherein the performing the background detection includes:
determining an intensity of a given pixel in the input document;
classifying the given pixel as belonging to white space if an intensity of the given pixel falls within a predetermined range, wherein the predetermined range corresponds with the background level; and
classifying the given pixel as belonging to image content if the intensity falls outside the predetermined range.

7. The method of claim 5, wherein the determining the neutral pixel detection tag for each pixel includes:
determining an amount of luminance variation between a current pixel and a neighborhood of pixels around the current pixel;
determining a new chrominance value for the current pixel using the amount of luminance variation; and
determining the neutral pixel detection tag using the new chrominance value.

8. The method of claim 1 further comprising:
performing background detection on the input document to determine the background level of a pixel;
in response to the background level of the pixel meeting a predetermined threshold, performing a neutral pixel detection on the pixel to determine a chrominance value of the pixel;
in response to the chrominance value meeting a second predetermined threshold, generating a tag for the pixel; and,
feeding the tag into an X-Y cut algorithm to decompose the image into a set of blocks.

9. The method of claim 8, wherein the tag is a binary tag associating the pixel as belonging to one of white pixel and nonwhite pixel.

10. The method of claim 1, wherein the performing the processing on the each blocks includes performing an operation selected from the group consisting of:
edge detection;
two-dimensional filtering;
background suppression;
color adjustment;
adjusting lightness and/or contract;
resizing;
color space conversion;
neutral replacement;
error diffusion; and
a combination of the above.

11. A document processing system comprising:
a document processing device for producing a digital representation of an original image; and
a processor for:
determining a background level for white space of the original image;
using the background level, identifying pixels not belonging to the white space;
generating a binary image of the original image based from the identified pixels;
identifying image content surrounded by the white space in the original image using the binary image;
generating a block for each image content;
extracting the each block from the original image;
performing processing on the each block; and
reapplying the processed blocks to a blank canvas to generate the digital representation.

12. The system of claim 11, wherein the processor is further operative to:
generate the block for the each image content by creating a bounding box around the each image content;
determine coordinates of the each bounding box;
reapply the processed blocks to the blank canvas using the coordinates.

13. The system of claim 11, wherein the processor is further operative to:
perform the processing on the each block in parallel while foregoing the processing on pixels belonging to the white space.

14. The system of claim 11, wherein the block generated for the each image content is surrounded by white space; wherein the processed blocks reapplied to the blank canvas are separated by white space; wherein the white space between the blocks on the canvas avoid stitching artifacts.

15. The system of claim 11, wherein the processor is further operative to:
perform background detection on a given pixel to determine whether the given pixel belongs to the white space or to image content;
perform a neutral pixel detection on the each pixel to generate a tag for the each pixel; and,
feed the tags into an X-Y cut algorithm to generate the binary image.

16. The system of claim 15, wherein the processor is further operative to:
determine an intensity of a given pixel in the input document;
classify the given pixel as belonging to white space if an intensity of the given pixel falls within a predetermined range, wherein the predetermined range corresponds with the background level; and
classify the given pixel as belonging to image content if the intensity falls outside the predetermined range.

17. The system of claim 15, wherein the processor is further operative to:
determine an amount of luminance variation between a current pixel and a neighborhood of pixels around the current pixel;
determine a new chrominance value for the current pixel using the amount of luminance variation; and
determine the neutral pixel detection tag using the new chrominance value.

18. The system of claim 11, wherein the processor is further operative to:
perform background detection on the input document to determine the background level of a pixel;

in response to the background level of the pixel meeting a predetermined threshold, perform a neutral pixel detection on the pixel to determine a chrominance value of the pixel;

in response to the chrominance value meeting a second predetermined threshold, generate a tag for the pixel; and, feed the tag into an X-Y cut algorithm to decompose the image into a set of blocks.

19. The system of claim 18, wherein the tag is a binary tag associating the pixel as belonging to one of white pixel and nonwhite pixel.

20. The system of claim 11, wherein the performing the processing on the each blocks includes performing an operation selected from the group consisting of:

edge detection;
two-dimensional filtering;
background suppression;
color adjustment;
adjusting lightness and/or contract;
resizing;
color space conversion;
neutral replacement;
error diffusion; and
a combination of the above.

* * * * *